United States Patent [19]

Schmoelz et al.

[11] 3,838,759

[45] Oct. 1, 1974

[54] JAW CLUTCH FOR MULTI-SPEED GEAR TRAINS OR THE LIKE

[75] Inventors: Hubert Schmoelz, Nattheim; Karl Otto Dahler; Erich Polzer, both of Heidenheim, all of Germany

[73] Assignee: Voith Getriebe KG, Heidenheim/Brenz, Germany

[22] Filed: Feb. 1, 1973

[21] Appl. No.: 328,626

[30] Foreign Application Priority Data
Feb. 5, 1972   Germany.............................. 2205546

[52] U.S. Cl................... 192/48.91, 74/371, 92/85, 92/116, 192/67 R
[51] Int. Cl. ...... F16d 11/10, F01b 11/02, F16j 1/22
[58] Field of Search.............. 192/48.91, 67 R, 99 S, 192/87.16; 74/371; 92/85, 116

[56] References Cited
UNITED STATES PATENTS

| | | | |
|---|---|---|---|
| 1,598,861 | 9/1926 | Hall ...................................... | 74/371 |
| 1,786,319 | 12/1930 | Starrett............................... | 74/371 X |
| 2,019,073 | 10/1935 | Cooper et al................... | 192/99 S X |
| 2,080,079 | 5/1937 | Johnson............................ | 192/99 S |
| 2,147,694 | 2/1939 | Fawick .............................. | 192/99 S |
| 2,585,408 | 2/1952 | Roberson.......................... | 92/116 X |
| 2,598,271 | 5/1952 | Klosterman....................... | 92/116 X |
| 2,683,377 | 7/1954 | Schmid ................................ | 74/371 |
| 2,755,678 | 7/1956 | MacDonald ...................... | 192/20 X |
| 3,136,228 | 6/1964 | Dailey................................... | 92/85 |
| 3,143,933 | 8/1964 | Norton................................. | 92/85 |

*Primary Examiner*—Allan D. Herrmann
*Attorney, Agent, or Firm*—Michael S. Striker

[57] ABSTRACT

A jaw clutch wherein a shaft has two sets of external teeth and is movable axially between a first position in which the clutch is disengaged and at least one second position in which the shaft connects a torque-supplying element with a torque-receiving element. The shaft is movable in axial passages of the torque-supplying and torque-receiving elements and is in permanent mesh with one of these elements. The two elements have sets of internal teeth which mate with the corresponding teeth of the shaft in engaged condition of the clutch. The teeth of at least one set of each pair of mating sets of teeth are relatively short so that both ends of the shaft are free to swivel within certain limits. The mechanism for shifting the shaft axially employs a lever or a cylinder which is connected with the shaft by a coupling member one end of which is articulately connected to the shaft by a self-aligning bearing and the other end of which is articulately connected with the lever or cylinder by a spherical joint or by an elastic ring seal. When the clutch is disengaged, one end of the shaft is centered in one of the clutch elements or by the coupling member which is then provided with an external cylindrical surface extending into an internal cylindrical surface of the housing for the clutch.

24 Claims, 6 Drawing Figures

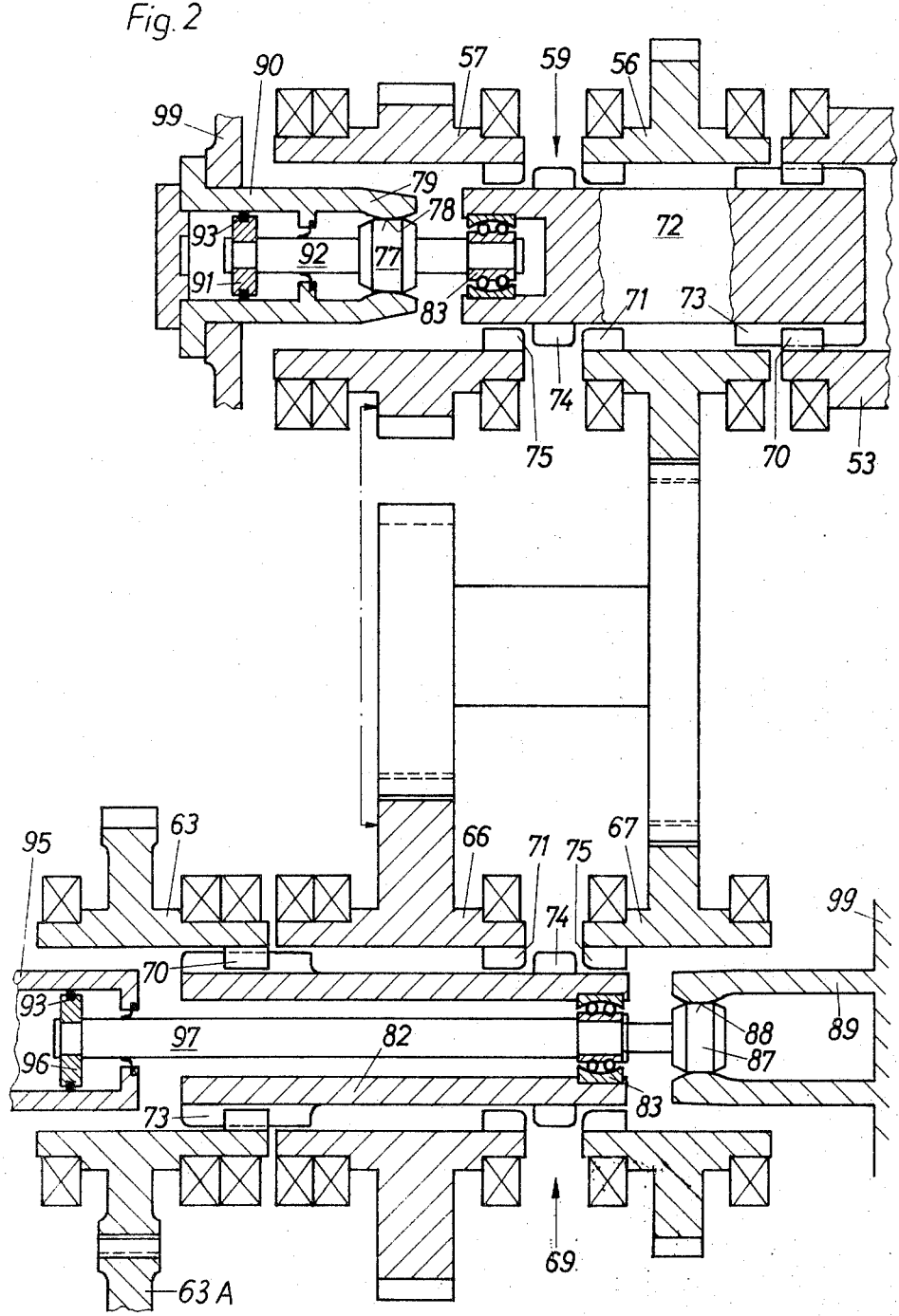

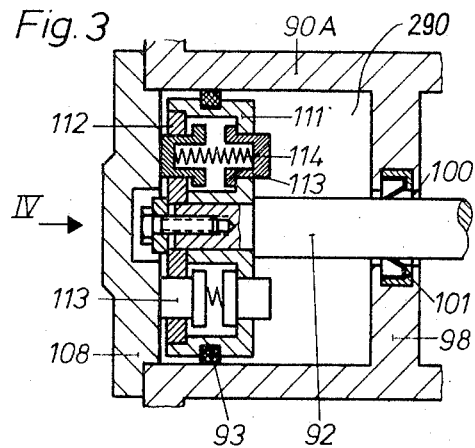
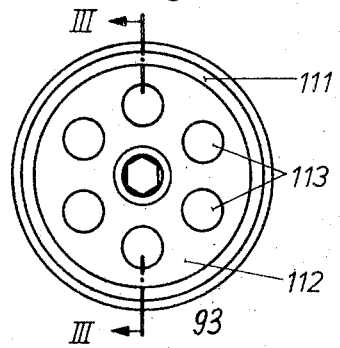
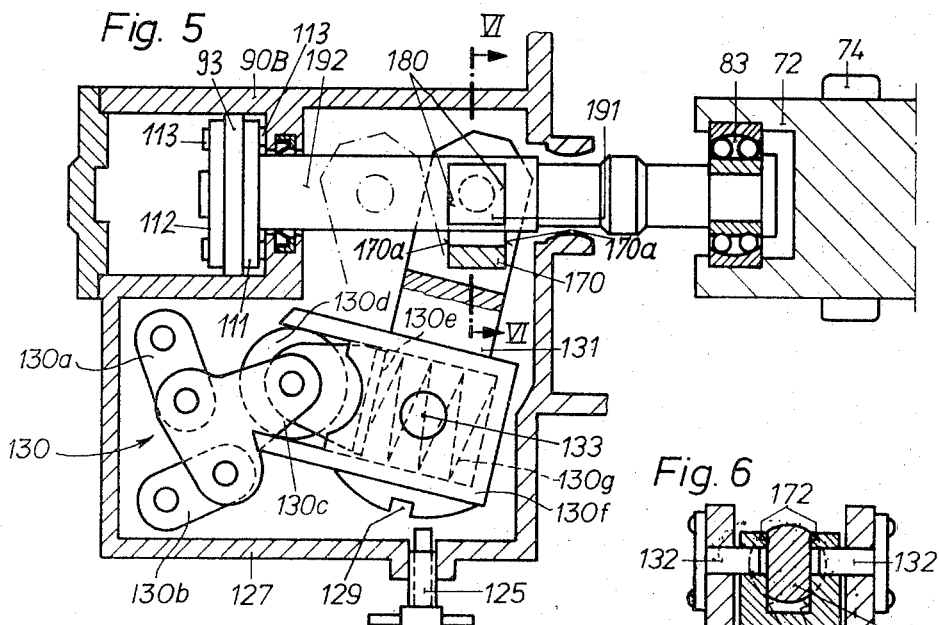
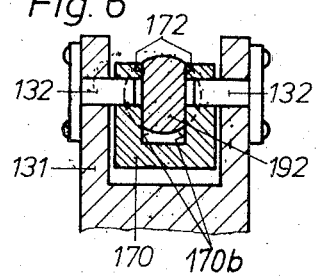

JAW CLUTCH FOR MULTI-SPEED GEAR TRAINS OR THE LIKE

BACKGROUND OF THE INVENTION

The present invention relates to clutches in general, and more particularly to improvements in jaw or claw clutches which can be utilized with advantage in multi-speed gear trains or the like. Still more particularly, the invention relates to improvements in jaw clutches of the type wherein an axially movable torque-transmitting clutch element is in permanent mesh with a rotary torque-supplying clutch element or with a rotary torque-receiving clutch element and can be moved into and out of mesh with at least one torque-receiving clutch element or at least one torque-supplying clutch element. For example, the jaw clutch which embodies the invention can be installed in the transmission case of a multi-speed change gear wherein the torque-supplying and torque-receiving elements are rotatable at fixed distance(s) from each other and the torque-transmitting element is movable axially to establish one or more driving connections between a rotary input member which drives the torque-supplying element and a single torque-receiving element (or a selected one of several torque-receiving elements) which drives an output member in forward or reverse at one or more different speeds, German printed publication No. 1,625,183 discloses a jaw clutch wherein an axially movable torque-transmitting element is in permanent mesh with a rotary torque-supplying element and can be moved into or out of mesh with a rotary torque-receiving element which is coaxial with and is mounted at a fixed distance from the torque-supplying element. At least one of the torque-supplying and torque-receiving elements is provided with an axial passage for the torque-transmitting element. The clutch further comprises means for centering the torque-transmitting element when the latter is disengaged from the torque-receiving element. The means for transmitting torque from the torque-supplying element to the torque-transmitting element comprises first and second sets of permanently meshing gear teeth, and the means for transmitting torque from the torque-transmitting element to the torque-receiving element comprises third and fourth sets of gear teeth which are in mesh only in a selected axial position of the torque-transmitting element, namely, when the clutch is engaged so that the torque-supplying element can drive the torque-receiving element by way of the torque-transmitting element. At least one of the first and second sets of teeth and at least one of the third and fourth sets of teeth is relatively short, as considered in the axial direction of the clutch elements. The aforementioned centering means is considered necessary in order to control the position of the torque-transmitting element when the latter is disengaged from the torque-receiving element; when the clutch is engaged, the torque-transmitting element is centered exclusively due to mating of its teeth with the teeth of the other two clutch elements. The displacing means for moving the torque-transmitting element axially into and from engagement with the torque-receiving element is mounted outside of the clutch.

The aforementioned printed publication further discloses a fourth clutch element (second torque-receiving element) which can be driven by the torque-transmitting element when the latter assumes a predetermined axial position in which it is disengaged from the first-mentioned torque-receiving element. The displacing means comprises a hydraulic cylinder which is rigid with the torque-transmitting element and is reciprocable along the piston rod of the piston therein. The cylinder has a long internal surface which slides along an elongated portion of the external surface of the piston rod and is held against rotation relative to the piston rod so that the cylinder, the piston and the piston rod rotate with the torque-transmitting element. The piston rod is rotatably mounted in a stationary housing so that it is held against axial movement. The piston rod is further held against any stray swiveling movements relative to the housing and relative to the torque-transmitting element of the clutch so that, when the torque-receiving element is driven by the torque-transmitting element, the latter is centered at three axially spaced points, namely, by the torque-supplying element, by the torque-receiving element, and by the piston rod which, as mentioned before, has a relatively long portion of its external surface in sliding contact with the cylinder. Such centering at three points is statically unstable and therefore highly undesirable, especially if the clutch elements are not machined and/or mounted with utmost precision, because it initiates the generation of radial forces which cause excessive wear on the aforementioned sets of teeth. Changes in temperature also produce radial forces which contribute to wear on the mating teeth or claws of the clutch elements.

A modified jaw clutch is described in a printed publication G 369 of Voith Getriebe KG, Heidenheim, Western Germany. This clutch is intended for use in a hydrodynamic mechanical transmission and its torque-supplying element is rigid or integral with the secondary shaft of a torque converter. The torque-receiving element is a relatively short hollow shaft which carries a spur gear and is rotatably mounted in the transmission case independently of and at a fixed distance from the torque-supplying element. A gear which transmits torque to a driven unit is in mesh with the gear on the torque-receiving element. The torque-transmitting element is a sleeve which has internal splines in mesh with external splines of the secondary shaft and can be coupled with the torque-receiving element (hollow shaft) by means of two sets of teeth which are in mesh only in a selected axial position of the sleeve. The sleeve can be moved axially by a mechanism which is connected thereto by way of an antifriction bearing. The teeth or claws of the aforementioned intermediate shaft are relatively short. It was found that in this clutch, too, even minor misalignment beween the axes of the clutch elements results in generation of excessive radial forces which produce extensive wear and thus shorten the useful life of the clutch. The aforementioned splines are so long that they effectively prevent even minor inclination of the axis of the sleeve relative to the axis of the secondary shaft or vice versa. It was further found that the just discussed radial stresses which develop in the event of minor misalignment of clutch elements produce axial forces which adversely affect the aforementioned bearing between the sleeve and the displacing means therefor. Moreover, such axial forces tend to change the axial position of the sleeve, especially during idling of the transmission, whereby the sleeve is likely to become disengaged from the torque-receiving element (hollow shaft). The provision of locking means for holding the sleeve in a selected axial position is not a satisfactory solution since such locking means merely counteracts but does not eliminate the axial forces (and/or the radial stresses which generate the axial forces).

In accordance with a further proposal (German Pat. No. 738,515), undesirable disengagement of a jaw clutch can be prevented by providing the clutch elements with wedge-like teeth or claws (as considered in the axial direction of the clutch elements) or by providing one end portion of each tooth or claw in one set of teeth with a projection which cannot enter the space between the adjacent teeth of the complementary set of teeth. Such types of teeth or claws can reduce (but not always eliminate) the likelihood of accidental disengagement of the torque-transmitting element from the torque-receiving element; moreover, they evidently cannot eliminate the causes of generation of axially oriented forces and/or radial forces which in turn generate axial forces. Still further, such teeth must be machined with an extremely high degree of precision so that they contribute excessively to the initial cost of the clutch.

A jaw clutch wherein the torque-receiving element is a sleeve exhibits the additional drawback that the machining of long internal splines in the sleeve and the machining of long external splines on the secondary shaft constitutes a difficult operation which must be carried out by resorting to special machines and must be performed or supervised by highly skilled personnel. The splines, as well as the teeth which connect the sleeve with the aforementioned intermediate shaft, must be hardened and polished. The hardening operation is likely to result in at least some distortion of the sleeve, especially if the wall thickness of the sleeve is relatively small (which is desirable to reduce the radial dimensions of the clutch). The polishing of long internal splines in a sleeve is an extremely difficult, time-consuming and hence expensive operation.

SUMMARY OF THE INVENTION

An object of the invention is to provide a novel and improved jaw clutch wherein the wear on mating teeth or claws is minimal even if the torque-supplying, transmitting and/or receiving elements of the clutch are not machined and/or mounted with utmost precision.

Another object of the invention is to provide a jaw clutch with novel and improved means for preventing unintentional disengagement or engagement of clutch elements.

A further object of the invention is to provide a jaw clutch which occupies little room, particularly as considered in the radial direction of its elements, and which can be used as a superior substitute for the aforedescribed conventional clutches in existing multi-speed gear trains or the like.

An additional object of the invention is to provide the jaw clutch with novel and improved displacing means for that clutch element which must be moved axially to establish or terminate a connection between one or more torque-supplying elements and one or more torque-receiving elements.

Still another object of the invention is to provide a jaw clutch with novel and improved centering means for the axially movable torque-transmitting element.

A further object of the invention is to provide a jaw clutch wherein the wear on mating teeth or claws is much less pronounced than in heretofore known jaw clutches in spite of the fact that the parts of the improved clutch need not be machined and/or mounted with a high degree of precision.

The invention is embodied in a jaw or claw clutch, particularly for use in multi-speed gear trains, which comprises a first rotary clutch element (e.g., a hollow spindle) a second rotary clutch element (the secondary shaft of a torque converter) which is at least approximately coaxial with the first clutch element, the first and second clutch elements being preferably mounted in the housing or case of a transmission at a fixed distance from each other, a third rotary clutch element (e.g., a solid or hollow shaft) which is movable substantially axially of the first and second clutch elements between a first position (clutch disengaged) and at least one second position, first and second sets of permanently meshing teeth or claws respectively provided on the first and third clutch elements, third and fourth sets of teeth or claws respectively provided on the second and third clutch elements and being in mesh in the one second position of the third clutch element, at least one of the first and second sets and at least one of the third and fourth sets of teeth being relatively short, as considered in the axial direction of the clutch elements, to permit free angular adjustment of the third clutch element relative to the first and second clutch elements, displacing means (e.g., a pivotable lever or a fluid-operated cylinder) which is actuatable to move the third clutch element between its first and second positions, a reciprocable coupling member (e.g., a piston rod connected with a piston which is movable in the aforementioned cylinder) interposed between the displacing means and the third clutch element, a first joint (e.g., self-aligning bearing means) connecting the coupling member wih the third clutch element, and a second joint (such as a ball-and-socket joint or an elastic sealing ring surrounding the aforementioned piston) articulately connecting the coupling member with the displacing means. The clutch preferably further comprises means for centering the third clutch element in the first position of this clutch element to compensate for lack of centering by the second clutch element when the third set of teeth is disengaged from the fourth set of teeth.

The novel features which are considered as characteristic of the invention are set forth in particular in the appended claims. The improved clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an axial sectional view of a second gear train including two-jaw clutches each of which is constructed and assembled in accordance with a second embodiment of the invention;

FIG. 3 is a fragmentary axial sectional view of a third clutch which constitutes a first modification of the clutches shown in FIG. 2, the section being taken in the direction of arrows as seen from the line III—III of FIG. 4;

FIG. 4 is an end elevational view as seen in the direction of arrow IV shown in FIG. 3;

FIG. 5 is a fragmentary axial sectional view of a jaw clutch which constitutes a second modification of the clutches shown in FIG. 2; and FIG. 6 is a fragmentary sectional view as seen in the direction of arrows from the line VI—VI of FIG. 5.

DESCRIPTION OF THE PREFERRED EMBODIMENTS

Figure 1:
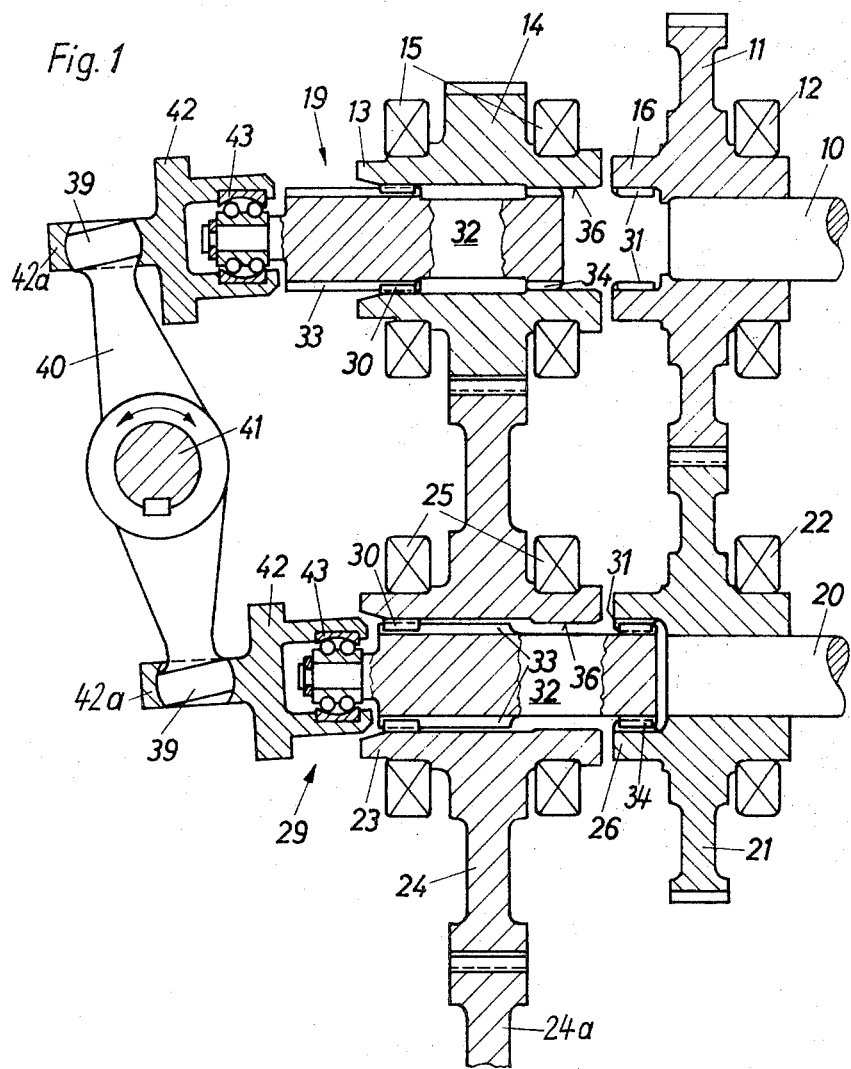
FIG. 1 is an axial sectional view of a four-speed gear train forming part of a hydrodynamic transmission and including two jaw clutches each of which is constructed and assembled in accordance with a first embodiment of the invention.

FIG. 1 illustrates a a four-speed spur gear train with two input shafts 10, 20 each of which constitutes the secondary shaft of a torque converter in a hydrodynamic transmission. Only one of the input shafts 10, 20 is used for transmission of torque at any time. The left-hand end portions of the input shafts 10, 20 are respectively connected with gears 11 and 21 which are in permanent mesh with each other. The hubs of the gears 11 and 21 are respectively rotatable in antifriction bearings 12 and 22 which are mounted in a housing, such as the transmission case (not shown). The right-hand end portions (not shown) of the input shafts 10, 20 are mounted in additional antifriction bearings which are not shown in FIG. 1.

Each of the input shafts 10, 20 can transmit torque to a discrete driven gear 14, 24 by way of a discrete novel jaw or claw clutch 19, 29. The gear 24 drives a further gear 24a which transmits torque to a unit (not shown) receiving motion from the gear train.

The torque-receiving element (first clutch element) of the clutch 19 includes a hollow spindle 13 which is rigid or integral with the driven gear 14 and has an annulus or set of internal gear teeth or claws 30. The spindle 13 is rotatable in two antifriction bearings 15 and is coaxial with the input shaft 10. The internal gear teeth 30 are provided in that end portion of the spindle 13 which is remote from the input shaft 10. The length of teeth 30, as considered in the axial direction of the spindle 13, is relatively short.

The torque-supplying element (second clutch element) of the clutch 19 is a relatively short hollow shaft 16 which is rigid or integral with the gear 11 on the input shaft 10 and has an annulus or set of internal gear teeth or claws 31. The shaft 16 extends beyond the adjacent left-hand axial end of the input shaft 10 and each of its teeth 31 is relatively short, as considered in the axial direction of the spindle 13.

The torque-transmitting element (third clutch element) of the clutch 19 is a shaft 32 which is movable axially in the spindle 13 and has two annuli sets of external gear teeth or claws 33 and 34. The teeth 33 mesh with the teeth 30 of the spindle 13 in each axial position of the shaft 32, and the teeth 34 mesh with the teeth 31 to transmit torque from the input shaft 10 to the gear 14 when the shaft 32 is shifted in a direction to the right, as viewed in FIG. 1, so that its right-hand end portion enters the hollow shaft 16 of the gear 11. The axial length of the teeth 33 preferably equals the length of teeth 30 plus the length of the maximum stroke of the shaft 32. It will be noted that the external teeth 33 of the shaft 32 are in permanent mesh with the internal gear teeth 30 of the spindle 13. When the shaft 32 assumes its second or operative position (in which the teeth 34 mesh with the teeth 31), it is centered by the two sets of mating gear teeth 30, 33 and 31, 34 which are of the self-centering type. When the shaft 32 dwells in the first or disengaged position of FIG. 1, it is centered by the gear teeth 30, 33 and by the gear teeth 34 in cooperation with a suitably dimensioned internal centering surface 36 of the spindle (first clutch element) 13. The top lands of teeth 34 are shown in abutment with the centering surface 36.

The clutch 29 is analogous to the clutch 19. It comprises a hollow spindle 23 which constitutes the torque receiving element (first clutch element) and is rigid or integral with the gear 24 (it will be noted that the gear 24 is larger than the gear 14). The spindle 23 has an annulus or set of internal gear teeth or claws 30 as well as an internal cylindrical centering surface 36, the same as the spindle 13 of the clutch 19. The spindle 23 is rotatable in two antifriction bearings 25 which are located at the opposite axial ends of the gear 24. The torque-supplying element (second clutch element) of the clutch 29 is a relatively short hollow shaft 26 which is rigid or integral with the gear 21 on the input shaft 20 and has an annulus or set of internal gear teeth or claws 31, the same as the hollow shaft 16 of the clutch 19. The torque-transmitting element (third clutch element) of the clutch 29 is a shaft 32 which is identical with the similarly referenced shaft of the clutch 19. The shaft 32 of the clutch 29 is shown in its operative or second position; thus, its teeth 33, 34 respectively mesh with the teeth 30 and 31 of the spindle 23 and shaft 26 so that, when the input shaft 20 is driven, it rotates the gear 24a by way of the shafts 26, 32 of the clutch 29, the spindle 23 and gear 24. The gear 24a rotates in a counterclockwise direction if the shaft 20 is driven in a clockwise direction, and vice versa. If the clutch 29 is engaged (while the clutch 19 is disengaged) and the shaft 10 is driven, it rotates the gear 24a by way of the gears 11, 21, clutch 29 and gear 24. The gear 24a then rotates in the same direction as the shaft 10. If the clutch 19 is engaged while the shaft 10 is driven, the gear 24a is driven by way of the clutch 19 and gear 24 and the speed of the gear 24a is less than if the input shaft 20 were driven at the same speed in disengaged condition of the clutch 19. Other possible speeds and directions of rotation of the gear 24a will be readily conceived upon perusal of the preceding description.

The gear shifter mechanism of FIG. 1 comprises a two-armed displacing lever 40 which is keyed to an actuating shaft 41 mounted in the transmission case. The displacing lever 40 comprises two spherical end portions 39 received in complementary sockets 42a of the two cupped coupling members 42. The axis of the actuating shaft 41 for the displacing lever 40 is normal to the axes of the input shafts 10, 20. Each coupling member 42 receives an antifriction bearing 43 of the type known as self-aligning rod-end bearing the inner race of which is secured to the adjacent end of the respective shaft 32. When the actuating shaft 41 is pivoted in a clockwise direction, the lower coupling member 42 disengages the clutch 29 while the upper coupling member 42 simultaneously engages the clutch 19, and vice versa. The actuating shaft 41 is further movable to a neutral position in which each of the clutches 19 and 29 is disengaged. The shafts 32 of the clutches 19, 29 then assume predetermined intermediate positions in which their gear teeth 34 are centered by the respective internal surfaces 36 but do not mesh with the internal gear teeth 31 of the respective hollow shafts 16, 26.

The illustrated relatively simple ball-and-socket joints 39, 42a between the arms of the displacing lever 40 and the coupling members 42 can be replaced by more sophisticated universal joints. the It will be noted that the coupling members 42 are connected with the respective shafts 32 (third clutch elements) by way of joints in the form of self-aligning bearings 43, and with the displacing lever 40 by ball-and-socket joints 39, 42a. This enables the coupling members 42 to move their axes into and out of exact alignment with the axes of the respective shafts 32. Thus, each coupling member 42 can swivel on the rolling elements of the respective self-aligning bearing 43 in any desired direction which practically eliminates the likelihood that the coupling members 42 could adversely affect the alignment of shafts 32 with the other clutch elements (13, 16 and 23, 26) of the respective clutches (19 and 29). In other words, the actuation of displacing means (i.e., the pivoting of displacing lever 40 by the actuating shaft 41) cannot result in generation of radial stresses upon the shafts 32 to that these shafts can not cause pronounced wear on the teeth 30, 31, 33 and 34 of the respective clutches. The configuration and axial lengths of these teeth can be readily selected in such a way that they cannot undergo excessive wear even if the elements of the clutches 19, 29 are not mounted and/or machined with utmost precision. At any rate, the provision of coupling members 42, self-aligning bearings 43 and ball-and-socket joints 39, 42a insures that the actuation of displacing means (40) does not generate any additional stresses acting radially of the shafts 32 and tending to generate axial forces which could disengage the clutches. As explained above, the axial length of teeth 30, 31 and 34 in each of the clutches 19, 29 is selected with a view to allow free angular adjustment of the axes of shafts 32 relative to the axes of the respective spindles (13, 23) and hollow shafts (16, 26). In other words, not only the coupling members 42 but also the shafts 32 have some freedom to adjust themselves so as to compensate for an offset of the two axes of the spindles (13, 23) and hollow shafts (16, 26); this is achieved by socalled cardanic mounting of each axial end of each shaft 32 and of each axial coupling member 42. Such free adjustment precludes the generation of any stresses which would cause increased wear upon the teeth of the clutch elements and/or undesirable axial displacements of the torque-transmitting clutch elements (shafts 32).

It will be noted that the sets of teeth 30, 33 not only serve to transmit torque from the shaft 32 to the spindle 13 (or from the shaft 32 to the spindle 23) or vice versa, but that these teeth also act not unlike a universal joint which allows the left-hand ends of shafts 32 to swivel in the respective spindles 13, 23, when the clutch rotates. The same holds true for the teeth 31, 34 in each of the clutches 19 and 29. The just described mounting of the ends of shafts 32 as well as of the ends of coupling members 42 can readily compensate for tolerances in the manufacture and/or mounting of clutch elements including such tolerances which, in the aforedescribed conventional clutches, would invariably cause pronounced wear on mating teeth and would invariably generate axial forces which would tend to disengage the torque-transmitting element from the torque-receiving element. Moreover, it was found that the illustrated teeth (including the relatively short teeth 30, 31 and 34) produce an automatic self-centering action. Such self-centering action reduces the likelihood of excessive wear upon the teeth, especially on the flanks of such teeth. Moreover, the self-centering action insures that, in the event of an angular misalignment of a shaft 32 relative to the other two clutch elements, the axial forces still acting upon the engaging flanks of mating teeth balance each other to thus reduce the likelihood of uncontrolled axial displacement of the shaft 32. The just discussed balancing or neutralization of axial forces also reduces the likelihood of subjecting the self-aligning bearings 43 to excessive axial stresses to that these bearings need not be dimensioned with a view to take up substantial axial stresses. In fact, the radial and axial dimensions of each clutch in the structure of FIG. 1 can be reduced well below those of conventional clutches for transmission of identical torques. The compactness of improved clutches is further attributable to the fact that the torque-transmitting elements of the clutches 19, 29 are shafts (32) rather than sleeves as in the aforediscussed conventional jaw clutches. Thus, the shafts 32 can be guided and centered within the other two elements of the respective clutches. As shown, the upper shaft 32 is permanently received in the axial passage or bore of the spindle 13 and can be received in the axial passage of the hollow shaft 16. Analogously, the lower shaft 32 is permanently received in the passage of the spindle 23 and can be moved into the passage of the hollow shaft 26. The provision of axial passages in the shafts 16, 26 and spindles 13, 23 for the respective shafts 32 greatly reduces the radial dimensions of the clutches 19, 29 so that these clutches can be used for transmission of torque at very high speeds. Moreover, the rotary parts of clutches 19, 29 can be mounted in less expensive antifriction bearings. It will be noted that, when looking in the axial direction of the clutch 19, not a single portion of the clutch includes three elements or components located radially outwardly of each other. Thus, the shaft 16 is located at a fixed distance from the spindle 13; the shaft 32 has an exposed first portion, a second portion which is received in the respective coupling member 42, a third portion which is received in the spindle 13 (and a fourth portion which is received in the shaft 16 when the clutch 19 is engaged); and the coupling member 42 is spaced apart from the clutch elements 13 and 16. The same holds true for the clutch 29. This also contributes to a reduction of dimensions of the clutches, as considered in the radial direction of the respective shafts 32.

The centering surfaces 36 are effective only when the respective clutches are disengaged. Thus, the surface 36 of the spindle 13 will center the right-hand end portion of the shaft 32 when the latter's teeth 34 are disengaged from the teeth 31 of the hollow shaft 13. The left-hand end portion (or a portion close to the left-hand end portion) of the shaft 32 is always centered by the constantly mating teeth 30 and 33. The top lands of teeth 34 on the shaft 32 form an interrupted external cylindrical surface which is received in the internal cylindrical surface 36 of the spindle 13 when the shaft 32 is disengaged from the shaft 16. As will be described in connection with FIG. 2, the external cylindrical centering surface can be provided on the coupling member and the internal cylindrical centering surface can be provided in the housing of the clutch or on a part which is rigid with the housing and may constitute or form part of the displacing means. In the clutches of FIG. 1, the internal cylindrical centering surfaces 36 are provided in the torque-receiving elements (spindles 13, 23) because the teeth 30 of these elements are in constant mesh with the teeth 33 of the respective shafts 32. Thus, when the upper shaft 32 is centered by the cylindrical surface 36 in the spindle 13, the top lands of its teeth 34 cannot slide in the circumferential direction of the spindle 13 because the teeth 33 cooperate with the teeth 30 to hold the shaft 32 against rotation in the spindle 13. The same applies for the shaft 32 of the clutch 29. The centering means for the shafts 32 of the clutches 19, 29 are inexpensive and can be provided in such clutches whenever the axial length of the spindle 13 or 23 (first clutch element) is sufficient to place the centering surface 36 at a certain axial distance from the respective teeth 30. As shown, the centering surface 36 is adjacent to one axial end and the teeth 30 are adjacent to the other axial end of the respective spindle.

The multi-speed forward and reverse gear train of FIG. 2 is somewhat similar to that disclosed in German Pat. No. 1,097,465. The input member is a hollow shaft 53 which also constitutes the torque-supplying element (first clutch element) of a first claw or jaw clutch 59. The gear which transmits torque to a dirven unit is shown at 63A; this gear meshes with a gear on a hollow spindle 63 which is the torque-receiving element (first clutch element) of a second jaw or claw clutch 69.

The clutches 59, 69 respectively comprise axially movable shafts 72, 82 which constitute the torque-transmitting elements (third clutch elements) of the respective clutches. Each of the shafts 72, 82 has an annulus or set of relatively long external gear teeth or claws 73 and an annulus or set of relatively short external gear teeth or claws 74. The teeth 73 of the shaft 72 are in permanent mesh with the relatively short internal gear teeth or claws 70 of the hollow shaft 53, and the teeth 73 of the shaft 82 are in permanent mesh with the relatively short internal teeth or claws 70 of the spindle 63. The teeth 74 of the shaft 72 can mesh with the relatively short internal gear teeth 71 of a hollow spindle 56 constituting a first torque-receiving element (second clutch element) of the clutch 59, with relatively short internal gear teeth 75 of a hollow spindle 57 constituting a second torque-receiving element (fourth clutch element) of the clutch 59, or assume the neutral positions shown in FIG. 2. Analogously, the teeth 74 of the shaft 82 can be moved into mesh with the relatively short internal gear teeth 71 of a hollow shaft 66 constituting a first torque-supplying element (second clutch element) of the clutch 69, with the relatively short internal gear teeth 75 of a hollow shaft 67 constituting a second torque-supplying element (fourth clutch element) of the clutch 69, or assume the neutral positions shown in FIG. 2. Thus, in the positions shown in FIG. 2, the clutches 59 and 69 are disengaged.

The gear shifter mechanism of FIG. 2 comprises a fluid-operated displacing cylinder 90 for the clutch 59 and a fluid-operated displacing cylinder 95 for the clutch 69. The axes of the displacing cylinders 90, 95 normally coincide with the axes of rotary elements of the respective clutches. In order to save space, the displacing cylinder 90 extends in part into the hollow spindle 57 of the clutch 59 and the displacing cylinder 95 extends in part into the hollow spindle 63 of the clutch 69. The piston 91 in the cylinder 90 is rigid with an elongated piston rod 92 whose free (right-hand) end is connected with the inner race of a joint here shown as a self-aligning bearing 83 mounted in the adjacent end portion of the shaft 72. In order to insure that the cardanic mounting of the piston rod 92 is similar to that of the shaft 72 (and to thus prevent stray forces from being transmitted to the sets of teeth 70, 71, 73, 74), the piston 91 is relatively short (as considered in the axial direction of the displacing cylinder 90) and is received in the displacing cylinder 90 with considerable radial clearance. The flow of fluid between the two cylinder chambers at the opposite sides of the piston 91 is prevented by the provision of a ring-shaped elastic seal 93 which constitutes a joint and is recessed into the peripheral surface of the piston 91 to engage the internal surface of the displacing cylinder 90. The parts 91 and 92 together constitute a coupling member which connects the displacing cylinder 90 with the shaft 72 of the clutch 59.

The piston in the displacing cylinder 95 is shown at 96; this piston is connected with an elongated piston rod 97 secured to and extending beyond the inner race of a self-aligning bearing 83 in the right-hand axial end of the shaft 82. The substantial annular gap between the peripheral surface of the piston 96 and the internal surface of the cylinder 95 is sealed by an elastic ring 93 which constitutes a joint articulately connecting the coupling member 96, 97 with the displacing cylinder 95.

When the clutch 59 is engaged, the shaft 72 is centered by the mating gear teeth 70, 73 and 74, 71 or 74, 75. When the clutch 59 is disengaged (as shown in FIG. 2), the shaft 72 is centered by mating gear teeth 70, 73 at one of its axial ends and by the piston rod 92 which has a cylindrical enlargement or boss 77 received in a cylindrical internal surface 78 provided in the adjacent centering end portion 79 of the displacing cylinder 90.

When the clutch 69 is engaged, the shaft 82 is centered by the mating gear teeth 70, 73 and 74, 71 or 74, 75. When the clutch 69 is disengaged (as shown in FIG. 2), the shaft 82 is centered by the gear teeth 70, 73 and by the piston rod 97 which has a cylindrical enlargement or boss 87 received in a cylindrical internal surface 88 of a centering sleeve 89 which is fixed to or made integral with the transmission case 99. The latter also supports the displacing cylinders 90 and 95. The two self-aligning bearings 83 participate in centering of the respective shafts 72, 82 when such shafts assume the neutral positions shown in FIG. 2. It will be noted that the internal centering surfaces 78 and 88 are provided on portions (displacing cylinder 90 and sleeve 89) which are rigid with the housing (transmission case 99) of the clutches 59, 69 and that the external centering surfaces are provided on the coupling members 91, 92 and 96, 97.

The end portion 79 of the displacing cylinder 90 constitutes an extension which is provided for the sole purpose of facilitating the centering of shaft 72 in disengaged condition of the clutch 59. The sleeve 89 is also provided for the express purpose of permitting proper centering of the shaft 82 in disengaged condition of the clutch 69; this sleeve is needed because the lower self-aligning bearing 83 of FIG. 2 is remote from the nearest end of the displacing cylinder 95 so that the latter cannot be provided with an extension, such as the extension 79 of the displacing cylinder 90. The shaft 82 in the clutch 69 is made hollow for the purpose of enabling the piston rod 97 to extend therethrough and to cooperate with the sleeve 89 in order to center the shaft 82 when the gear teeth 74 of this shaft are disengaged from the adjacent gear teeth 71 as well as from the adjacent gear teeth 75.

The various antifriction bearings (shown but not identified in FIG. 2) for rotary elements of the clutches 59, 69 and for other rotary parts of the gear train are mounted in the transmission case 99.

The gear of the spindle 57 is connected with the gear on the shaft 66 by one or more intermediate gears or the gears of the spindle 57 and shaft 66 are in direct permanent mesh with each other (as indicated by arrows). when the shaft 53 rotates in a clockwise direction and the clutch 59 is engaged so that the shaft 72 couples the shaft 53 with the spindle 57, the latter drives the shaft 66 which can drive the spindle 63 (and hence the gear 63A) when its teeth 71 mesh with the teeth 74 of the shaft 82. Additional modes of power flow from the shaft 53 to the gear 63A will be achieved by engaging the clutches 59 and 69 in other ways.

The centering means for the shafts 72, 82 of the clutches 59, 69 must be provided on parts other than the clutch elements (see the parts 53, 56, 57 and 72 of the clutch 59 and the parts 63, 66, 67 and 82 of the clutch 69) because the parts 53, 63 are too short to be provided with internal centering surfaces corresponding to those shown at 36 in FIG. 1. This is due to the fact that the elements 56, 57 and 66, 67 of the clutches 59, 69 are rather closely adjacent to each other i.e., the axial distance between the teeth 71, 75 in each of the clutches 59, 69 is preferably just sufficient to allow for movement of shafts 72, 82 to the illustrated neutral positions in which the teeth 74 of the shaft 72 are disengaged from the adjacent teeth 71, 75 and the teeth 74 of the shaft 82 are also disengaged from the adjacent teeth 71, 75. The placing of clutch elements 56, 57 and 66, 67 close to each other is desirable in order to reduce the overall axial lengths of the respective clutches. The clutches 59, 69 preferably employ relatively short shafts 72, 82 for the same reason, i.e., to reduce their axial lengths. This explains why the centering surfaces 78, 88 for the shafts 72, 82 are not provided in the shaft 53 and spindle 63, i.e., in those (first) clutch elements which are in permanent torque-transmitting or torque-receiving engagement with the shafts 72, 82 (compare with FIG. 1 wherein the centering surfaces 36 are provided in (first) clutch elements 13, 23 which are in permanent engagement with the axially movable shafts 32). As disclosed above, the centering means for the shafts 72, 82 of the clutches 59, 69 includes first portions (displacing cylinder 90 and sleeve 89) which are rigid with the housing (transmission case 99) and have internal cylindrical surfaces (78, 88) and second portions (bosses 77, 87) provided on the coupling members (91, 92 and 96, 97) and having external cylindrical surfaces which enter the respective internal cylindrical surfaces 78, 88 in the neutral positions of the respective shafts 72, 82. Thus, when the shaft 72 of the clutch 59 dwells in the illustrated neutral position, it is centered by the respective teeth 70, 73 at one end and by the coupling member 91, 92 and transmission case 99 at the other end. The centering of the other end is effected by way of the self-aligning bearing 83, boss 77, displacing cylinder 90 and extension 79 (which latter can be replaced by a sleeve rigid with the case 99 and not necessarily connected with the displacing cylinder 90). The centering of the shaft 82 in disengaged condition of the clutch 69 is analogous.

The just described mode of centering the shafts 72 and 82 would appear at a first glance to constitute a substantial departure from the mode of centering the shafts 32 in the clutches 19, 29 of FIG. 1. The differences between the two centering methods are attributable to the fact that the shafts 72, 82 of the clutches 59, 69 are movable from first or neutral positions to two operative or second positions so as to respectively engage the clutch elements 56, 57 (clutch 59) and 66, 67 (clutch 69). It will be noted that each of the shafts 72, 82 moves from the illustrated neutral position in a first direction to respectively engage the clutch element 56 or 67 and in a second direction to respectively engage the clutch element 57 or 66. The provision of one portion of each centering means on the respective coupling member (91, 92 or 96, 97) is believed to constitute a departure from conventional centering procedures, especially in view of the fact that one end of each coupling member is articulately connected with the respective shaft 72, 82 by a first joint (self-aligning bearing 83) and that the other end of each coupling member is articulately connected with the respective displacing cylinder 90, 95 by a second joint (ring 93). The mounting of shafts 72, 82 is such that each thereof can undergo an automatic self-centering action when the respective clutch is in use because each end of each of the shafts 72, 82 is capable of swiveling with respect to the part which is connected thereto when the shafts 72, 82 assume the illustrated neutral positions. Thus, the right-hand end of the shaft 72 can swivel to a certain extent in the axial passage of the shaft 53 and the left-hand end of the shaft 72 can swivel to a certain extent around the self-aligning bearing 83 at the right-hand axial end of the piston rod 92.

It is clear that the clutches 59, 69 of FIG. 2 could be modified by employing pistons 91, 96 which are slidable in the respective displacing cylinders 90, 95 with minimal clearance and by replacing the sealing rings 93 with universal joints (e.g., ball-and-socket joints) installed between the pistons 91, 96 and the respective piston rods 92, 97. The joints illustrated in FIG. 2 are preferred at this time because they are simpler, less expensive and readily accessible for inspection and/or replacement.

FIGS. 3 and 4 illustrate a modified fluid-operated displacing cylinder 90A which can be used in the gear train of FIG. 2 to replace the cylinder 90 or 95. The hollow piston in the cylinder 90A comprises two sections or walls 111, 112 the first of which is cupped to receive the other. Each of these sections is provided with six equidistant axially parallel holes for reciprocable inserts 113 of a cushioning device. The flanges of inserts 113 in the interior of the hollow piston normally abut against the internal surfaces of the respective sections 111, 112 under the action of helical springs 114. It will be noted that each insert 113 in the section 111 registers with an insert 113 in the section 112 so that a total number of six springs 114 suffices to maintain the inserts in their extended positions. It is assumed that the right-hand chamber 290 of the cylinder 90A is filled with a pressurized fluid; therefore, at least some of the left-hand inserts 113 of FIG. 3 abut against the left-hand end wall 108 of the cylinder 90A. Inversely, when the left-hand chamber of the cylinder 90A receives a pressurized fluid, the hollow piston moves in a direction to the right and the inserts 113 in the section 111 of the piston abut against the right-hand end wall 98 of the cylinder 90A. The piston rod 92 is rigidly fixed to both sections 111, 112 of the piston and extends with substantial clearance 100 through a central opening of the end wall 98. This clearance is sealed by a ring-shaped elastic seal 101.

The purpose of the inserts 113 (which can be received in the respective sections 111, 112 with some freedom of swiveling movement) is to uniformly distribute axial forces which are transmitted by the piston rod 92 when the right hand or the left-hand inserts 113 abut against the respective end wall 98, 108 of the displacing cylinder 90A. Such uniform distribution of stresses is insured even if the piston rod 92 is somewhat inclined relative to the displacing cylinder 90A so that its axis does not coincide exactly with the axis of the cylindrical wall of this cylinder. The clearance 100 between the end wall 98 and the external surface of the piston rod 92 is selected with a view to allow for certain pivoting of the piston rod relative to the cylinder 90A.

The cushioning device including the axially movable inserts 113 and their springs 114 is desirable in order to insure that a piston (see the piston 91 or 96 of FIG. 2) will not move into a mere point contact with the respective displacing cylinder when it reaches the one or the other end position in the displacing cylinder, even if the axis of the respective piston rod is then inclined relative to the cylinder axis. Since the fluid which is admitted into the chambers of the displacing cylinder 90A is often maintained under considerable pressure, a piston which is rigidly connected with the respective piston rod and abuts against the adjacent end wall of the displacing cylinder at a single point would be likely to undergo excessive deforming stresses which are eliminated by the provision of inserts 113 and springs 114 because such cushioning device invariably insures that the end wall 98 or 108 is engaged by several inserts 114 in the respective end position of the piston even if the axis of the piston rod 92 is inclined with respect to the cylinder axis. In the absence of inserts 113, the piston would tend to pivot the piston rod 92 back into axial alignment with the displacing cylinder 90A as soon as the piston would move into a mere point contact with the end wall 98 or 108 whereby the piston rod 92 would exert upon the respective shaft (such as the shaft 72 or 82 of FIG. 2) radial stresses which could cause pronounced wear on the mating teeth and would generate axial forces tending to move the shaft 72 or 82 out of mesh with the associated clutch element (56 or 57 in clutch 59 and 66 or 67 in clutch 69).

The structure shown in FIGS. 3 and 4 can be modified in a number of ways without departing from the spirit of the invention. For example, and as explained above, the sealing ring 93 can be replaced with a ball-and-socket joint between the piston rod 92 and the piston in the displacing cylinder 90A. Also, the piston of FIG. 3 could be replaced with a piston having two convex end faces and the end walls 98, 108 could be provided with concave internal surfaces. The latter solution is less desirable because the radius of curvature of the concave internal surface of the end wall 98 (through which the piston rod 92 extends) would have to be very large (in order to avoid excessive weakening of this end wall) with the result that the piston would be likely to jam on engagement with the end wall 98 to thus eliminate at least some advantages of cardanic mounting of the torque-transmitting element in the respective clutch. It is further possible to install cushioning devices in the end walls of the displacing cylinder.

If the displacing lever 40 of FIG. 1 is replaced by two single-acting displacing cylinders, the inserts 113 in the portion 111 or 112 of the piston shown in FIG. 3 can be dispensed with. Still further, the springs 114 of FIG. 3 can be omitted if the inserts 113 (or the outwardly extending portions of these inserts) consist of elastomeric material. It was found that the inserts 113 (in cooperation with the springs 114) reduce the likelihood of generation of appreciable radial stresses upon the clutch element which is coupled to the piston 92 even if the inclination of the piston rod 92 relative to the displacing cylinder 90A is such that each of the springs 114 undergoes a different deformation when the piston assumes its right-hand or left-hand end position so that some of the inserts 113 abut against the end wall 98 or 108. In accordance with still another embodiment of the invention, the inserts 113 and springs 114 of FIG. 3 can be replaced by a cushioning device including elastic rings which are inserted into recesses provided therefor in one or both end faces of the piston and/or in the internal surface of the end wall 98 and/or 108.

FIG. 5 illustrates a modified displacing cylinder 90B which can be used as a substitute for the displacing cylinder 90 or 95 of FIG. 2. The piston at the left-hand axial end of the piston rod 192 is identical with the piston of FIG. 3 and is reciprocable in the cylinder 90B which latter is made rigid or integral with a casing 127 for a toggle mechanism 130. The toggle mechanism 130 comprises a spring-biased link 131 which serves to hold the shaft 72 (which is assumed to be identical with the shaft 72 in the upper portion of FIG. 2) in either of its two extreme positions. The link 131 is constructed and mounted in such a way that it applies to the piston rod 192 a force which is invariably parallel to the axis of the piston rod. To this end, the peripheral surface of the piston rod 192 is provided with two parallel grooves 191 which are normal to the axis of the piston rod 192 and receive the arms of a U-shaped follower 170. Two surfaces 170a of each arm of the follower 170 are slidable along the side faces 180 of the piston rod 192 in the respective groove 191. The link 131 has a bifurcated end portion which receives the follower 170 and carries two coaxial trunnions 132 (see FIG. 6) for the respective arms of the follower 170. The common axis of the trunnions 132 (on which the follower 170 is free to pivot) is normal to the axis of the piston rod 192 and parallel to the axis of a pivot 133 serving to articulately connect the link 131 with the casing 127. The mode of operation of the remaining parts of the toggle mechanism 130 will be readily understood from an observation of FIG. 5. It suffices to say that the link 131 can pivot between the solid-line and phantom-line positions of FIG. 5 which respectively correspond to the two end positions of the shaft 72 (in which the teeth 74 of the shaft 72 respectively mate with the teeth 71 and 75 shown in the upper part of FIG. 2). The distances between the inner ends of the trunnions 132 and the adjacent flat surfaces 172 in the grooves 191 of the piston rod 192 on the one hand and the distances between the flat surfaces 172 and the adjacent surfaces 170b of the arms of the follower 170 on the other hand are selected with a view to allow for at least some swiveling of the piston rod 192 in all directions. The remaining parts of the toggle mechanism 130 include two levers 130a, 130b which are pivotably mounted in the casing 127, a T-shaped intermediate member 130c which is articulately connected with the levers 130a, 130b and carries a roller 130d, a plunger 130e pivoted to the member 130c and reciprocable in an open-ended guide 130f of the link 131, and a spring 130g which biases the plunger 130e outwardly. The roller 130 d also extends into the guide 130f.

The spring-biased link 131 of the toggle mechanism 130 has a notch 129 which can receive the tip of an arresting screw 125 in the neutral position of the shaft 72. The screw 125 is threadedly connected to and extends into the casing 127. This screw can be rotated by hand or by remote control.

The toggle mechanism 130 of FIGS. 5 and 6 constitutes a simple but efficient detent structure which is capable of yieldably holding the shaft 72 in engagement with the clutch element 56 or 57 of FIG. 2. This is a safety feature which is desirable in order to further reduce the likelihood of uncontrolled axial movement of the shaft 72 from engagement with the clutch element 56 or 57. The toggle mechanism 130 is somewhat similar to that disclosed in German printed publication No. 1,149,735 (to which reference may be had, if necessary) but differs from such conventional toggle mechanism in that the spring-biased link 131 invariably subjects the coupling member (including the piston 111, 112 in the displacing cylinder 90B and the piston rod 192) to axial stresses (without the generation of any radial stresses) in each end position of the piston. This is achieved by the provision of the follower 170 whose surfaces 170a engage the adjacent side faces 180 in the corresponding grooves 191 of the piston rod 192 so that the follower 170 cannot tilt (or cannot tend to tilt) the piston rod 192 in either end position of the piston. The provision of trunnions 132 enables the follower 170 to turn relative to the link 131 while the piston rod 192 moves axially to thus reduce the likelihood that the piston rod would be subjected to radial stresses, at least when the piston in the displacing cylinder 90B assumes the one or the other of its end positions.

The surfaces 172 in the grooves 191 of the piston rod 192 and the adjacent surfaces 170b of the follower 170 further contribute to elimination of appreciable radial stresses upon the piston rod 192 in either end position of the piston. The surfaces 170b are normal to the axes of trunnions 132.

The toggle mechanism 130 of FIGS. 5 and 6 could be replaced by a twin or double cardanic joint which, however, is much more expensive and complex than the illustrated detent means.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A jaw clutch, particularly for use in multispeed gear trains, comprising a first rotary clutch element a second rotary clutch element at least approximately coaxial with said first clutch element; a third rotary clutch element movable substantially axially of said first and second elements between a first position and at least one second position, said first and third elements respectively having first and second sets of permanently meshing teeth, said second and third elements respectively having third and fourth sets of teeth meshing in said one second position of said third element, at least one of said first and second sets and at least one of said third and fourth sets of teeth being relatively short, as considered in the axial direction of said elements, to permit free angular adjustment of said third element relative to said first and second elements; displacing means actuatable to move said third element beween said positions; a reciprocable coupling member interposed between said displacing means and said third element; a first joint articulately connecting said coupling member with said third element; and a second joint articulately connecting said coupling member with said displacing means.

2. A clutch as defined in claim 1, wherein one of said joints is a self-aligning bearing.

3. A clutch as defined in claim 1, further comprising a housing, said first and second clutch elements being rotatable in said housing at a fixed distance from each other, at least one of said first and second clutch elements being provided with an axial passage for said third clutch element.

4. A clutch as defined in claim 1, further comprising means for centering said third clutch element in said first position thereof, said means for centering being nearer to said third than to said first set of teeth so as to compensate for the centering action of said third and fourth sets of teeth in said one second position of said third clutch element.

5. A clutch as defined in claim 1, wherein said second joint is an universal joint.

6. A clutch as defined in claim 1, further comprising a fourth rotary clutch element coaxial with said first and second clutch elements, said third and fourth clutch elements respectively having fifth and sixth sets of teeth which mesh in another second position of said third clutch element.

7. A clutch as defined in claim 6, wherein said fifth set of teeth constitutes said fourth set of teeth.

8. A clutch as defined in claim 6, further comprising a housing said first, second and fourth clutch elements being rotatable in said housing at fixed distances from each other and said third clutch element being movable axially from said first position in first and second directions to respectively assume said one and said other second position thereof.

9. A clutch as defined in claim 8, wherein said coupling member is substantially coaxial with said third clutch element.

10. A clutch as defined in claim 9, further comprising means for centering said third clutch element in said first position thereof, said means for centering including a first portion provided on said coupling member and a second portion rigid with said housing.

11. A clutch as defined in claim 10, wherein one of said portions has an external cylindrical surface and the other of said portions has an internal cylindrical surface receiving said external surface in said first position of said third clutch element.

12. A clutch as defined in claim 10, wherein said second portion of said means for centering forms part of said displacing means.

13. A clutch as defined in claim 1, wherein said displacing means comprises a fluid-operated cylinder and said coupling member includes a piston reciprocable with clearance in said cylinder and a piston rod rigid with said piston and connected to said third clutch element by way of said first joint, said second joint including an elastic device interposed between the periphery of said piston and said cylinder.

14. A clutch as defined in claim 13, wherein said elastic device is a ring-shaped seal.

15. A clutch as defined in claim 13, wherein said cylinder comprises two spaced-apart end walls and further comprising compressible cushioning means interposed between said piston and at least one of said end walls, said piston being adjacent to said one end wall in one of said positions of said third clutch element whereby said cushioning means is compressed between said piston and said one end wall.

16. A clutch as defined in claim 15, wherein said cushioning means comprises at least one spring-biased insert movably mounted in said piston and abutting against said one end wall in said one position of said third clutch element.

17. A clutch as defined in claim 16, wherein said cushioning means comprises a plurality of equidistant spring-biased inserts axially movably mounted in said piston and having portions normally extending beyond said piston toward said one end wall of said cylinder.

18. A clutch as defined in claim 1, further comprising detent means for yieldably holding said third clutch element in said one second position.

19. A clutch as defined in claim 18, wherein said coupling member is substantially coaxial with said third clutch element and said detent means comprises a toggle mechanism having a spring-biased link articulately connected with said coupling member.

20. A clutch as defined in claim 19, wherein said link is pivotable about an axis which is normal to and crosses in space with the axis of said third clutch element, said coupling member having at least one pair of external side faces normal to the axis of said third clutch element and said toggle mechanism having a portion provided with complementary surfaces which slide along said external side faces during axial movement of said third clutch element.

21. A clutch as defined in claim 20, wherein said portion of said toggle mechanism is a follower articulately connected with said link and slidably extending into external grooves of said coupling member, said external side faces flanking said grooves of said coupling member.

22. A clutch as defined in claim 21, wherein said follower is pivotable relative to said link about an axis which is parallel to the axis of said link.

23. A clutch as defined in claim 21, wherein said follower and said coupling member have abutting surfaces located in planes normal to the axis of said link.

24. A clutch as defined in claim 1, wherein said displacing means comprises a pivotable lever and said second joint is a ball-and-socket joint.

* * * * *